United States Patent [19]

Pomper et al.

[11] 4,404,227

[45] Sep. 13, 1983

[54] BREAD MIX AND PROCESS

[75] Inventors: Seymour Pomper, Stamford; Glenn D. La Baw, Greenwich, both of Conn.

[73] Assignee: Nabisco Brands, Inc., Parsippany, N.J.

[21] Appl. No.: 268,701

[22] Filed: Jun. 1, 1981

[51] Int. Cl.$^3$ ........................ A21D 8/00; A21D 10/00
[52] U.S. Cl. ........................................ 426/19; 426/21; 426/62; 426/551; 426/555
[58] Field of Search ........................ 426/19, 21, 23, 24, 426/26, 62, 551–555, 561; 426/653–654, 804

[56] References Cited

U.S. PATENT DOCUMENTS

| | | | |
|---|---|---|---|
| 3,535,120 | 10/1970 | Bouchard et al. | 426/19 |
| 3,632,355 | 1/1972 | Umina et al. | 426/551 |
| 3,767,422 | 10/1973 | Levitz | 426/551 |
| 3,780,188 | 12/1913 | Isen et al. | 426/21 |
| 3,962,480 | 6/1976 | Wolf | 426/23 |
| 4,219,580 | 8/1980 | Torres | 426/21 |
| 4,244,980 | 1/1981 | Fischer et al. | 426/555 |
| 4,308,286 | 12/1981 | Anstett | 426/551 |

FOREIGN PATENT DOCUMENTS

| | | | |
|---|---|---|---|
| 674910 | 11/1963 | Canada | 426/551 |
| 56-51946 | 5/1981 | Japan | 426/551 |

Primary Examiner—Raymond N. Jones
Assistant Examiner—Elizabeth A. Hatcher
Attorney, Agent, or Firm—R. Kornutik

[57] ABSTRACT

A process for preparing a dry bread mix containing flour, from 1.5 to 2.5% quick-leavening active dry yeast, from 2 to 10% of a balanced chemical leavening system, and from 0.1 to 0.75% of a dough conditioner comprising calcium or sodium stearoyl -2- lactylate.

28 Claims, No Drawings

BREAD MIX AND PROCESS

BACKGROUND OF THE INVENTION

The present invention relates to bread; and more particularly, to an improved dry mix and a method which enable the rapid and simplified production of high quality bread in the home.

Baking bread is normally a complicated procedure which takes from 3.5 to 5 hours to complete. A typical procedure calls for forming a dough by mixing water, yeast, flour and other minor additives such as salt, sugar, and shortening in a bowl and then kneading by alternately flattening and folding for a period of at least about 10 minutes. After the kneading, the dough is placed in a warm environment to permit the yeast to ferment, causing the dough to rise and to effect the proper changes in the gluten and starch portions of the flour. After this initial fermentation, during which the dough will have doubled in volume, the dough is then punched down, kneaded for another two or three minute period, and subjected to an intermediate fermentation or proofing step until the volume has again doubled. The large dough mass is then worked by hand, divided into units of suitable size for baking, and placed in pans where it is permitted proof for another 30 minutes or so to double the volume. Finally, the dough is then baked for about 30 minutes. Because of this complex procedure, very few people find the time to prepare home-baked fresh bread—despite its universal appeal.

Recently, there have been developed batter recipes for preparing home-baked bread with reduced time and effort commitments. However, because a true dough is not formed, the texture of the bread, including its resilience and crumb, cannot be considered to be of high quality. These bread mixes typically contain excess water, chemical leavening, and medium-soft flour which permit the formation of a batter; however, it is the batter form of the product which is responsible for the relatively inferior quality of the end product.

In one recent attempt to provide an improved dry mix and process for home bread baking, Henika et al disclose in U.S. Pat. No. 3,615,680, a dry mix which contains essential gluten activating and maturing agents, with the activating agent being present at levels sufficient to react with substantially all of the protein in the dough to achieve desired dough viscosities in a short mixing period. Starch modifying agents are also used for improvement of flavor and dough properties, and slow-acting oxidants or maturing agents are also employed. While the disclosed procedure does provide a significant simplification over the prior art, it is still more complicated than would be desired, and we have had difficulty in reproducing the quality indicated in the patent. Specifically, reference to Example 1 shows an initial step of separately hydrating the active dry yeast with water prior to mixing with the remaining dry ingredients. Then, after mixing is completed, the resulting dough is allowed to ferment for at least 15 minutes. After fermentation is completed, the dough is then kneaded steadily for about 3 minutes. Following these stages, the dough is divided into suitably-shaped pieces and placed in a baking pan. Then, the dough is placed in an oven maintained at about 140° F. for 30 minutes for proofing prior to baking in conventional manner. While this procedure does permit the reduction in the fermentation and kneading requirements normally necessary for bread preparation, it achieves this only with the addition of gluten activating and maturing agents and still requires significant fermentation and kneading in combination with a proofing step which requires careful temperature control. In fact, the initial step of hydrating the active dry yeast requires careful temperature control, although it is indicated that it is possible to add all of the ingredients to the water at one time.

In another effort to produce a simplified bread mix and process, it is disclosed in U.S. Pat. No. 3,617,305, that the use of an additive composition containing defined amounts of an ascorbate compound, an edible oxidizing agent, and an edible sulfhydryl-containing reducing agent, permits a substantial reduction in the time usually required for the kneading and fermentation steps, and in certain instances, either one of these steps may be eliminated. Significantly, however, either a significant kneading time (on the order of 4 minutes or more) after the initial mixing, or an initial fermentation (of from at least 15 to about 60 minutes) is required for good results. And, it is preferred in all instances that kneading be conducted for at least about 1 minute. Thus, while this procedure does to some extent simplify the home baking procedure and reduce the time requirements, further improvement would be desired.

SUMMARY OF THE INVENTION

It is an object of the present invention to provide a dry mix and a process which permit the simple preparation of bread in a total time from addition to water to completion of baking of less than 90 minutes, and preferably less than about 75 minutes.

It is another object of the present invention to provide a dry mix and a process for simply preparing high quality bread through the unique combination of a particular class of dough conditioners, chemical leavening, and type of yeast, employed at critically-effective levels to virtually eliminate any requirement for fermenting the dough after initial preparation, for kneading the dough prior to proofing, and to reduce the overall preparation time.

These and other objects are achieved according to the present invention which provides a bread mix characterized by its ability to form a high quality bread in less than 90 minutes from addition of water to completion of baking, an improved process for preparing bread employing the bread mix, and the product of that process. In its broad aspects, the bread mix comprises: flour; from 1.5 to 2.5% quick-leavening active dry yeast; from 2 to 10% of a balanced chemical leavening system; and from 0.1 to 0.75% of a dough conditioner selected from the group consisting of calcium stearoyl-2-lactylate, sodium stearoyl-2-lactylate, and mixtures of these; all percentages based on the weight of the mix.

The process in its aspects comprises: mixing the above dry mix with water to form a dough; shaping the dough for baking; proofing the shaped units for from about 15 to about 30 minutes; and baking. The product of this process is also claimed.

DETAILED DESCRIPTION

The dry mix and process of the present invention are applicable to the preparation of virtually any type of bread or yeast-leavened dough product. Particularly preferred products include white bread, French-style white bread, rye bread, and pumpernickel bread. The type of flour employed will be selected not only for its gluten content, but also its desired flavor and texture imparting characteristics to achieve the desired type of bread while not parting from the basic achievement of the invention. Among the suitable flours are high gluten wheat flour, rye flour, pumpernickel meal, whole-wheat flour, cracked-wheat flour, and other bleached or unbleached flours. For best results, it is preferred to employ a major proportion, on the order of at least 70% of the flour mixture of a high gluten flour having a protein content of at least about 14%. Also important in the selection of the flour are the variety and a low ash content. However, those skilled in the art will be able to vary the type of flour as is conventional in the art to achieve desired textural variations.

Among the advantages of the present invention is its ability to avoid two of the most prevalent causes for failure in bread preparation by novices—namely, improper yeast rehydration and variation in flour quality. This can be attributed to the employment of a critical combination of a particular type of yeast, a chemical leavening system, and a particular class of dough conditioners at critical levels. The yeast is of a type, activity, and dispersibility which permits its incorporation into the dough by simple mixing to provide a uniform dispersion at a high level without the typically-associated textural graininess and spotted appearance to the crust when other types of yeast at similar levels are employed. According to the present invention, the yeast need not be separately rehydrated, but is preferably hydrated simply by the mixing of the dry mix with hot tap water. The chemical leavening system is preferably of a type which will react to give off carbon dioxide only under conditions of heat achieved during baking, e.g. dough temperatures in excess of 120° F., which are detrimental to continued yeast activity. Combining these features with the use of dough conditioners which are selected to achieve rapid hydration of the dough yet permit easy mixing and suitable strengthening of the dough to entrap evolved $CO_2$, virtually eliminates the usual difficulties encountered with variations in flour quality which may otherwise cause gross variations in final bread quality following a standardized process. Moreover, they permit good loaf volume and texture to be achieved in a simple process which takes a minimum amount of time.

The yeast employed according to the present invention is a quick-leavening active dry yeast. Yeasts of this type are characterized by a relatively high protein content, preferably from about 40 to about 60%; a small uniform particle size, preferably on the order of from about 0.2 to about 2.0 millimeters in diameter; and a relatively low moisture content, typically on the order of from about 3 to about 8%, preferably from about 4 to about 5%. Preferably, yeasts of this type will contain minor amounts, e.g. from 0.5 to 2%, of a surface-active agent such as polysorbate 60, or diacetyl esters of fully-saturated vegetable oils, and a minor amount, e.g. from 0.5 to 1%, of a stabilizer such as carboxymethylcellulose, and other hydrophilic colloids, which are employed in the formation of the dispersion of yeast to achieve the desired low moisture content upon drying but yet permit rapid rehydration. One process for preparing a quick-leavening active dry yeast is described in U.S. Pat. No. 3,843,800 to Langejan. The disclosure of this patent is hereby incorporated herein by reference in its entirety. Another procedure for preparing the quick-leavening active dry yeast is described in Canadian Pat. No. 1,075,077, and the entire disclosure of this patent is likewise incorporated herein by reference.

The proper leavening within the short period of time contemplated by the present invention, requires the use of at least 1.5, and up to 2.5%, of quick-leavening active dry yeast in the formulation. Preferred levels will be within the range of from about 1.65 to about 2.15% based on the weight of the mix. It has been found that the levels lower than these minima will not provide the desired leavening while levels above these maxima will tend to impart a noticeable yeasty off flavor. To achieve the necessary leavening, it is essential that the yeast be of the quick-leavening type described above or there will be insufficient volume in the final product. Even with these levels of a suitably active yeast, it is essential that the yeast be readily dispersible uniformly throughout the dough with minimal mixing. This also dictates the use of quick-leavening active dry yeast as defined above. The conditions under which the yeast is dried, the noted additives, and the particle size of the quick-leavening active dry yeast are believed important to provide the desired degree of dispersibility.

Also essential to the composition of the bread mix of the invention is the presence of an effective amount, within the range of from 2 to 10%, of a balanced chemical leavening system comprising an acid and a base. By the term "balanced chemical leavening system" it is meant that proper levels of a suitable acid and a suitable base are present to substantially fully react with each other to generate carbon dioxide. The chemical leavening system is preferably of a type which will react to give off carbon dioxide only under conditions of heat achieved during baking, e.g.. dough temperatures in excess of 120° F., which would otherwise be detrimental to continued yeast activity. Thus, despite the short proof time of from 15 to 30 minutes, the dough will have enough internal strength to hold carbon dioxide generated by the balanced chemical leavening system to achieve the desired final bread volume. Among the suitable balanced chemical leavening systems are those comprising, based on the weight of the mix: from 4.24 to 6.4% glucono-delta-lactone with 2.0 to 2.44% sodium bicarbonate; from 1.5 to 3.4% sodium aluminum phosphate with from 1.24 to 2.5% sodium bicarbonate; from 1.7 to 2.0% sodium acid pyrophosphate with from 1.25 to 1.5% sodium bicarbonate; and from 1.25 to 2.5% sodium aluminum sulfate with an equal weight of sodium bicarbonate.

Further essential to the composition of the bread mix of the invention is the presence of a dough conditioner selected from the group consisting of calcium stearoyl-2-lactylate, sodium stearoyl-2-lactylate and mixtures of these. The dough conditioner must be present at a level of from 0.1 to 0.75% based on the weight of the mix. While it has been determined that a preferred level of about 0.4 to about 0.6% can be employed with good results for most types of breads, certain types of textures, such as a French bread texture will be achieved with lower levels on the order of from about 0.1 to 0.2% based upon the weight of the mix.

The calcium stearoyl-2-lactylate and sodium stearoyl-2-lactylate are well known for use in yeast-leavened doughs and are believed to somehow complex with the protein of bread doughs, forming cross linkages between protein platelets and their adjacent sheets. In this manner, these dough conditioners provide broad tolerance in dough mixing times, improve the hydration of the dough, improve dough handling, and also strengthen the doughs so that poor or weak flours will perform better. These effects were studied and reported upon by William H. Knightly in "The Evolution of Softeners and Conditioners Used in Baked Foods", THE BAKERS DIGEST, October 1973, pages 64–75, and V. A. DeStefanis in "Binding of Crumb Softeners and Dough Strengtheners During Bread Making", CEREAL CHEMISTRY, January-February 1977, pages 13–24. One preferred type of sodium stearoyl-2-lactylate is sold under the registered trademark EMPLEX and is described by the manufacturer as being prepared by the reaction of stearic acid and lactic acid followed by the conversion to the sodium salt. This product is indicated to have the following analytical specifications:

| Acid Value | 60–80 |
| Ester No. | 150–190 |
| Sodium content | 2.5–5.0% |

The unique combination of the specific level of the quick-leavening active dry yeast and the sodium or calcium stearoyl-2-lactylate dough conditioners provide a simplicity in processing and a consistency in results which is quite surprising. By the use of this novel combination in a dry bread mix according to the invention, it is possible to prepare bread by a highly simplified process which eliminates kneading of the dough after initial mixing and virtually eliminates a separate step of fermenting following the mixing step. In its broad aspects, the process comprises mixing water with a dry mix to form a dough, the dry mix being of the type described above comprising flour, from 1.5 to 2.5% quick-leavening active dry yeast, from 2 to 10% of a balanced chemical leavening system, and from 0.1 to 0.75% of a dough conditioner selected from the group consisting of calcium stearoyl-2-lactylate, sodium stearoyl-2-lactylate, and mixtures of these, all percentages based on the weight of the dry mix; shaping the dough into units of the desired weight for baking; proofing the shaped units for from about 15 to about 30 minutes; and baking.

To achieve the best results according to this process, it is preferred to permit the dough to rest for a period of from about 3 to less than 15 minutes, preferably from 5 to 10 minutes after mixing and before shaping. While some fermentation of the quick-leavening active dry yeast does occur during this period, this resting step is not primarily for the purpose of fermenting which, according to the prior art procedures, has entailed extended periods of time of up to several hours, but is primarily for the purpose of permitting the moisture within the dough to more uniformly hydrate the dry ingredients to enable less troublesome shaping of the dough into units of the desired size and shape for baking. The sodium or calcium stearoyl-2-lactylate dough conditioner is advantageously performing its function during the rest period, by enhancing the hydration and strengthening the dough. It is noted that U.S. Pat. No. 3,843,800 which describes the preparation of quick-leavening active dry yeast sets forth in Example 10 a test of the baking quality of the yeast as compared to other types of yeast and shows a total fermentation or proof time of 145 minutes with a full 85 minutes of that time being prior to a final proof of 60 minutes. By employing the unique combination of the sodium or calcium stearoyl-2-lactylate dough conditioner at the indicated levels along with the indicated levels of quick-leavening active dry yeast and the balanced chemical leavening system according to the present invention, this 85-minute initial fermentation time can be eliminated and replaced with a very short rest period just sufficient in length to permit the water, through the action of the dough conditioner, to fully hydrate the dough to provide a workable mass.

An advantage of the present invention resides, however, in the fact that where an extended period of time for the rest period is required to coordinate the baking of the bread with other activities in the kitchen or for any other reason, that additional resting time will not adversely affect the quality of the bread produced.

Similarly, kneading the dough after mixing is not required when employing the bread mix of the present invention because the simple mixing followed by the rest step, wherein the dough is uniformly hydrated and strengthened by the dough conditioner is sufficient to provide a high quality bread product. The dispersibility of the yeast, combined with its quick-leavening activity at the high level employed and the dough strengthening effect of the dough conditioner, enable the rapid achievement of the suitable dough characteristics to permit good gas retention during an extremely short final proof on the order of from about 15 to about 30 minutes, preferably about 20 to about 25 minutes. Thus, the present invention eliminates any requirement for kneading as conventionally performed in prior art by vigorously working, such as by alternately folding and flattening the dough. The rapid, uniform dispersibility of the yeast within the dough by simple mixing, followed by the resting period wherein the sodium or calcium stearoyl-2-lactylate dough conditioner and water act in concert to hydrate the dough and strengthen it sufficiently to retain gas, as it is later developed during proofing and baking, are effective without any kneading. However, where desired by a particular baker, or due to a mistake in shaping the dough into the desired size, extended periods of working the dough in a manner similar to conventional kneading will not adversely affect the final quality of the bread.

The water added to the dry ingredients to form the dough is preferably tap water at a temperature within the range of from about 100° to 140° F. This permits, in a typical formula for preparing a single loaf of bread, the addition of about 240 milliliters of water (1 cup) to from about 400 to 410 grams of dry mix, to achieve an ideal temperature for activating the yeast of within the range of from about 85° to 100° F. The temperature of the final dough is brought to a temperature within this range simply by the addition of the hot tap water. Typically, the hottest available tap water can be used with good results.

The yeast will preferably be packaged separately from the other ingredients of the dry bread mix and will be blended with them prior to adding the water. The water is then simply added and the combined mixture is stirred briskly until the dough becomes stiff and most of the flour has been mixed in. At this point, it is preferred to take the dough in the hands and to fold and turn it in the bowl to pick up the remaining flour mixture. It is preferred that the step of mixing be terminated upon adherence of substantially all of the flour to the resulting dough and that the dough then be immediately rested without kneading to permit the dry ingredients to hydrate. The rest period will preferably be at least 3 minutes but less than 15 minutes after mixing and prior to shaping. A particularly preferred rest time will be within the range of from 5 to 10 minutes.

After the rest period, the dough will have achieved the proper uniform hydration and texture to permit it to be shaped into suitably-sized portions for baking. One preferred procedure is to take a weight of dough suitable for preparing a single loaf of bread, to flatten that into a sheet and then to roll the sheet into an approximately cylindrical shape. Looking at the rolled cylinder of dough end-wise, it will appear much like a jelly roll. Preferably the free edge of the dough along the length of the roll is pinched to form a seal. The thus suitably-portioned dough is then ready for proofing after only from about 15 to about 25 minutes after initially starting the mixing. And, except for the baking pan or sheet, the baker can begin cleanup.

The suitably-portioned dough is placed in a warm, covered environment for a period of from about 15 to about 30 minutes for proofing. The ambient temperature should be within the range of from about 80° to about 120° F., but a wide tolerance is possible. Where a lower temperature is employed, say on the order of 70° F., the proofing time will be somewhat longer, but it will still be possible to stay within the 90 minutes time limit for the complete preparation. Higher temperatures are of no advantage and may decrease yeast activity. Preferably, a proofing time of from about 20 to about 25 minutes will be employed. Thus, the baker can have all utensils except, for that used to hold the dough during proofing, cleaned up; and he can have the oven preheated to the proper temperature for baking—well in advance of the time at which the dough should be placed in the oven for baking. Baking is then done in conventional fashion at a temperature within the range of from about 375° to about 425° F., preferably about 400° F. Typical baking times will be on the order of from about 30 to about 35 minutes, depending upon the size and shape of the dough portion.

The advantages of the bread mix and the process of the invention have been explained above in a manner which is generalized to all of the various types of breads which can be prepared according to the invention. The following several paragraphs will, however, detail specific formulas for preparing a white bread, a French-style bread, a rye bread, and a pumpernickel bread according to the invention. These specific formulations, in addition to the broader aspects of the invention described above, are also believed to be novel and to result in surprisingly good bread products.

The bread mix according to the invention for preparing French bread will preferably comprise high gluten wheat flour, and sodium stearoyl-2-lactylate as the dough conditioner at a level of from about 0.1 to 0.2% based on the weight of the mix; and, the mix will further comprise inactive dry yeast at a level of from about 0.1 to 0.5% also based upon the weight of the mix. In its more preferred aspects, the French bread mix will consist essentially of high gluten wheat flour; from about 0.2 to 0.3% inactive dry yeast; from about 1.5 to about 2.5% sodium chloride; from about 1.5 to 2.5% sugar; from about 0.1 to 0.15% sodium stearoyl-2-lactylate; from 4.24 to 6.4% glucono-delta-lactone with from 2.0 to 2.44% sodium bicarbonate; and from about 1.75 to 1.95% quick-leavening active dry yeast; all percentages based upon the weight of the mix. The sugar employed will preferably be sucrose, but can comprise corn syrup solids, high fructose corn syrup solids, dextrose, fructose, maltose, and other related sugars normally employed in food products.

For preparing a white bread according to the present invention, the flour will preferably comprise high gluten wheat flour, and the dough conditioner will preferably comprise sodium stearoyl-2-lactylate at a level of from about 0.4 to about 0.6% based on the weight of the mix. The white bread mix in its more specific aspects will consist essentially of: high gluten wheat flour; from about 4 to about 6% sugar; from about 1.5 to about 2.5% sodium chloride; from about 4 to about 8% granular shortening; from about 0.4 to about 0.6% sodium stearoyl-2-lactylate; from 4.24 to 6.4% glucono-delta-lactone with from 2.0 to 2.44% sodium bicarbonate; and from about 1.75 to about 1.95% quick-leavening active dry yeast; all percentages based on the weight of the mix. The sugars are similarly defined as those for the French-style bread mix. The granular shortening is preferably one prepared by spray drying an emulsion of suitable fat in an aqueous continuous phase containing a suitable encapsulating agent such as a dextrin. Typical of the commercially-available granular shortenings which can be employed are: ARMOUR Spray Dried Shortening, Code 4200, which is a spray dried emulsion of partially hydrogenated soybean oil, non-fat dry milk, mono and diglycerides and an antioxidant; and BEATRICE Spray Dried Shortening.

To prepare a rye bread according to the invention, the bread mix will preferably comprise a blend of high gluten wheat flour and rye flour; from about 0.4 to about 0.6% sodium stearoyl-2-lactylate based on the weight of the mix; and the mix will further comprise a rye bread flavorant. In its more specific aspects, the rye bread mix according to the invention will consist essentially of: a blend of high gluten wheat flour and rye flour; flavorants; from about 0.2 to about 0.3% inactive dry yeast; from about 1.5 to about 2.5% non-fay dry milk; from about 1.0 to about 2.5% sodium chloride; from about 1.0 to about 2.5% sugar; from about 1.0 to about 2.0% granular shortening; from about 0.4 to about 0.6% sodium stearoyl-2-lactylate; from 4.24 to 6.4% glucono-delta-lactone with from 2.0 to 2.44% sodium bicarbonate; and from about 1.75 to about 1.95% quick-leavening active dry yeast; all percentages based on the weight of the mix. A preferred rye bread flavorant which we have developed for use in preparing a realistic high quality rye bread comprises, based on the weight of the flavorant: rye flour, about 3 to about 9% dill seed, about 4 to about 10% caraway, about 15 to about 40% salt, about 0.25 to about 2% fennel, about 0.05 to about 2.5% onion powder, about 0.1 to about 1% acedic acid, about 2.5 to about 10% lactic acid, about 2.0 to about 8% phosphoric acid, about 0.1 to about 0.4% propionic acid, and preferably a spice mix which contains essential oils of caraway, dill, and fennel.

To prepare a pumpernickel bread mix according to the present invention, the flour will comprise a blend of high gluten wheat flour, rye flour, and pumpernickel meal; the dough conditioner will preferably comprise sodium stearoyl-2-lactylate in an amount of from about 0.4 to 0.6 based upon the weight of the mix; and the mix will further include brown colorant and pumpernickel flavorant. In its more specific aspects, the pumpernickel bread mix according to the invention will consist essentially of: a blend of high gluten wheat flour, rye flour and pumpernickel meal; flavorants; brown colorants; from about 0.2 to about 0.3% inactive dry yeast; from about 1.0 to about 2.5% sodium chloride; from about 1.0 to 2.5% sugar; from about 1.0 to about 2.0% granular shortening; from about 0.4 to about 0.6% sodium stearoyl-2-lactylate; from 4.24 to 6.4% glucono-delta-lactone with from 2.0 to 2.44% sodium bicarbonate; and from about 1.75 to 1.95% quick-leavening active dry yeast; all percentages based upon the weight of the mix. A preferred flavorant for the pumpernickel bread will be the preferred rye flavorant described above, and the sugar will preferably contain brown sugar.

The following examples are presented for the purpose of further illustrating and explaining the present invention and are not to be taken as limiting in any regard. Unless otherwise indicated, all parts and percentages are based upon the total weight of the formulation at the indicated stage in processing.

EXAMPLE 1

This example illustrates the preparation of a white bread according to the present invention. The bread is prepared from the following dry ingredients:

| Ingredients | Grams | % Based on Dry Wt |
|---|---|---|
| Flour - high gluten[a] | 313.02 | 76.85 |
| Glucono-delta-lactone | 22.40 | 5.50 |
| Sodium Bicarbonate | 10.58 | 2.60 |
| Sodium Chloride | 6.70 | 1.65 |
| Sucrose | 20.10 | 4.93 |
| Shortening[b] | 25.00 | 6.14 |
| Sodium Stearoyl-2-lactylate[c] | 2.00 | 0.49 |
| Quick-leavening Active Dry Yeast[d] | 7.50 | 1.84 |
| | 407.30 | 100.00 |

[a]ADM
[b]ARMOUR Spray Dried Code 4200
[c]EMPLEX
[d]FERMIPAN

The quick-leavening active dry yeast, which is packaged separately from the remainder of the ingredients, is blended with the other dry ingredients in a bowl to which is added one cup (240 ml) of hot tap water. The water and the dry ingredients are stirred briskly until the dough becomes stiff and most of the flour has been mixed in. Then, with lightly floured hands, the dough is folded and turned in a bowl to pick up the remaining flour mixture. After this, the dough is permitted to rest for 5 minutes. Following resting, the dough is taken from the bowl with floured hands and set on a lightly-floured surface where it is shaped into a smooth ball and then flattened by pushing and patting the dough into a rectangle of about 8 by 10 inches in dimensions. The dough is then turned over and again flattened into a smooth sheet. Then, starting at the short side of the rectangle, the dough sheet is rolled up tightly into a cylindrical form in the manner of a jelly roll. The free edge along the length of the roll is then sealed by pinching to form a seam. The roll of dough is then placed seam side down in a greased 8½×4½×2½ inch loaf pan, covered with a dish towel, and placed in a warm draft-free area (about 85° F.) for about 25 minutes to allow the dough to rise. Meanwhile, the oven is preheated to 400° F. After the 25-minute proofing period, the towel is removed and the dough is baked at 400° F. for about 30 to 35 minutes until the crust is golden brown. The resulting loaf shows good volume, grain and crumb.

EXAMPLE 2

This example illustrates the preparation of a French style bread from the following ingredients:

| Ingredients | Grams | % Based on Dry Wt |
|---|---|---|
| Flour - High Gluten[a] | 350.02 | 85.89 |
| Glucono-delta-lactone | 22.40 | 5.50 |
| Sodium Bicarbonate | 10.58 | 2.60 |
| Inactive Dry Yeast[e] | 1.00 | 0.25 |
| Sodium Chloride | 7.70 | 1.89 |
| Sucrose | 7.80 | 1.91 |
| Sodium Stearoyl-2-lactylate[c] | 0.50 | 0.12 |
| Quick-leavening Active Dry Yeast[d] | 7.50 | 1.84 |
| | 407.50 | 100.00 |

[a], [c], [d]Same as Example 1
[e]FLEISCHMANN - Type 7B

The bread is prepared in the same manner as discussed in Example 1 except that: the dough is flattened out to about 10×13 inches before rolling; and, after rolling, the roll of dough is placed seam side down on a greased baking sheet, covered with a towel, and proofed.

EXAMPLE 3

This example illustrates the preparation of a rye bread according to the invention employing the following formulation:

| Ingredients | Grams | % Based on Dry Wt |
|---|---|---|
| Flour - High Gluten[a] | 294.02 | 72.44 |
| Flour - Medium Rye | 22.00 | 5.42 |
| Rye Sour Flavor[h] | 15.00 | 3.69 |
| Glucono-delta-lactone | 22.40 | 5.50 |
| Sodium Bicarbonate | 10.58 | 2.60 |
| Inactive Dry Yeast[e] | 1.00 | 0.25 |
| Non Fat Dry Milk (High Heat) | 7.50 | 1.85 |
| Sodium Chloride | 5.90 | 1.45 |
| Sucrose | 5.50 | 1.35 |
| Non Diastatic Malt[f] | 5.50 | 1.35 |
| Shortening[b] | 5.50 | 1.35 |
| Sodium Stearoyl-2-lactylate[c] | 2.00 | 0.49 |
| Ground Caraway | 1.10 | 0.27 |
| Dill | 0.50 | 0.12 |
| Quick-leavening Active Dry Yeast[d] | 7.50 | 1.85 |
| | 406.00 | 100.00 |

[a], [b], [c], [d]Same as Example 1
[e]Same as Example 2
[f]FLEISCHMANN Spray Malt
[g]Rye Sour Flavor Premix

| | wt % |
|---|---|
| Rye flour (medium) | 48.62 |
| Dill Seed | 6.00 |
| Crushed Caraway | 7.14 |
| Salt | 25.00 |
| Fennel | 1.00 |
| Onion Powder | 0.15 |
| Glacial Acetic Acid | 0.50 |
| Lactic Acid | 5.50 |
| Phosphoric Acid | 5.50 |
| Propionic Acid | 0.27 |
| Spice Mix | 0.32 |

Again the procedure of Example 1 is followed to prepare this bread with only exceptions being: the dough is rested for 10 minutes after mixing; the dough ball is flattened to a dimension of 8×12 inches prior to rolling; the rolled dough is placed on a greased cooking sheet, shaped into a long oval, and covered; and after proofing, the top of the dough is cut with three diagonals and wetted with an egg white glaze.

EXAMPLE 4

This example illustrates the preparation of a pumpernickel bread from a mix having the following formulation:

| Ingredients | Gram | % Based on Dry Wt |
|---|---|---|
| Flour - High Gluten[a] | 252.02 | 62.62 |
| Flour - Medium Rye | 37.00 | 9.18 |
| Flour - Pumpernickel Meal | 25.00 | 6.20 |
| Glucono-delta-lactone | 22.40 | 5.50 |
| Sodium Bicarbonate | 10.58 | 2.60 |
| Inactive Dry Yeast[e] | 1.00 | 0.25 |
| Sugar Color[h] | 15.00 | 3.72 |
| Rye Sour Flavor[g] | 11.20 | 2.78 |
| Sodium Chloride | 5.00 | 1.24 |
| Brown Sugar[i] | 5.00 | 1.24 |
| Non Diastatic Malt[f] | 5.30 | 1.32 |
| Shortening[b] | 5.00 | 1.24 |
| Sodium Stearoyl-2-lactylate[c] | 1.00 | 0.25 |
| Quick-leavening Active Dry Yeast[d] | 7.50 | 1.86 |
|  | 403.00 | 100.00 |

[a], [b], [c], [d] Same as Example 1.
[e] Same as Example 2
[f] Same as Example 3
[g] Same as Example 3
[h] Sethness RT #12
[i] DOMINO brand, Brownulated.

The procedure of Example 1 is again followed, modified as follows: the dough is rested for 10 minutes after mixing; the dough ball is not reshaped, but placed directly on a greased baking sheet for proofing; and an egg white glaze is applied prior to baking.

The above description has been for the purpose of teaching the person of ordinary skill in the art how to practice the present invention. This description is not intended to detail each and every obvious modification of the invention which will become apparent to the person skilled in the art upon reading. Applicants do intend, however, to include all such modifications and variations within the scope of their invention which is defined by the following claims.

We claim:

1. A process for preparing bread which comprises: mixing water with a dry bread mix to form a dough, the dry mix comprising flour, from 1.5 to 2.5% quick-leavening active dry yeast, from 2 to 10% of a balanced chemical leavening system, and from 0.1 to 0.75% of a dough conditioner selected from the group consisting of calcium stearoyl-2-lactylate, sodium stearoyl-2-lactylate, and mixtures of these, all percentages based on the weight of the dry mix; shaping the dough into units for baking; proofing the shaped units for from about 15 to about 30 minutes; and baking.

2. A process according to claim 1 wherein the dough is rested for a period of from 3 to less than 15 minutes after mixing and before shaping.

3. A process according to claim 1 wherein the dough is shaped by flattening into a sheet and then rolling the sheet into a cylindrical shape.

4. A process according to claim 1 wherein the temperature of the water is within the range of from about 100° to about 140° F.

5. A process according to claim 1 wherein about 240 ml of water is added to from about 400 to about 410 grams of dry mix.

6. A process according to claim 1 wherein the ambient temperature during proofing is within the range of from about 80° to about 120° F.

7. A process according to claim 1 wherein the dry mix comprises from 1.65 to 2.15% quick-leavening active dry yeast.

8. A process according to claim 7 wherein the temperature of the water is within the range from about 100° to about 140° F.

9. A process according to claim 8 wherein the dough is rested for a period of from 3 to less than 15 minutes after mixing and prior to shaping.

10. A process according to claim 9 wherein the dough is rested for from 5 to 10 minutes after mixing and prior to shaping.

11. A process according to claim 9 wherein the step of mixing the water with the dry bread mix is terminated upon adherence of substantially all of the flour to the resulting dough, and the dough is immediately rested without kneading to permit the dry ingredients to hydrate.

12. A process according to claim 11 wherein the dough is shaped by flattening into a sheet and then rolling the sheet into a cylindrical shape.

13. A process according to claim 1 wherein the balanced chemical leavening system comprises a couple selected from the group consisting of: from 4.24 to 6.4% glucono-delta-lactone and from 2.0 to 2.44% sodium bicarbonate; from 1.5 to 3.4% sodium aluminum phosphate and from 1.24 to 2.5% sodium bicarbonate; from 1.7 to 2.0% sodium acid pyrophosphate and from 1.25 to 1.5% sodium bicarbonate; and from 1.25 to 2.5% sodium aluminum phosphate and an equal weight of sodium bicarbonate.

14. A bread mix characterized by its ability to form a high quality bread in less than 90 minutes from addition of water to completion of baking, which comprises: flour; from 1.5 to 2.5% quick-leavening active dry yeast; from 2 to 10% of a balanced chemical leavening system; and from 0.1 to 0.75% of a dough conditioner selected from the group consisting of calcium stearoyl-2-lactylate, sodium stearoyl-2-lactylate, and mixtures of these; all percentages based on the weight of the mix.

15. A bread mix according to claim 14 wherein the quick-leavening active dry yeast is employed in an amount of from 1.65 to 2.15% based on the weight of the mix.

16. A bread mix according to claim 14 wherein the dough conditioner comprises sodium stearoyl-2-lactylate.

17. A bread mix according to claim 14 which further comprises sodium chloride and sugar.

18. A bread mix according to claim 14 for preparing French bread wherein the flour comprises high gluten wheat flour; the dough conditioner comprises sodium stearoyl-2-lactylate at a level of from about 0.1 to about 0.2% based on the weight of the mix; and the mix further comprises inactive dry yeast at a level of from about 0.1 to about 0.5% based on the weight of the mix.

19. A bread mix according to claim 18 which consists essentially of: high gluten wheat flour; from about 0.2% to about 0.3% inactive dry yeast; from about 1.5 to about 2.5% sodium chloride; from about 1.5 to about 2.5% sugar; from about 0.1 to about 0.15% sodium stearoyl-2-lactylate; from 4.24 to 6.4% glucono-delta-lactone with from 2.0 to 2.44% sodium bicarbonate; and from about 1.75 to about 1.95% quick-leavening active dry yeast; all percentages based on the weight of the mix.

20. A bread mix according to claim 14 for preparing white bread wherein the flour comprises high gluten wheat flour, and the dough conditioner comprises sodium stearoyl-2-lactylate at a level of from about 0.4 to about 0.6% based on the weight of the mix.

21. A bread mix according to claim 20 which consists essentially of: high gluten wheat flour; from about 4 to about 6% sugar; from about 1.5 to about 2.5% sodium chloride; from about 4 to about 8% granular shortening; from about 0.4 to about 0.6% sodium stearoyl-2-lactylate; from 4.24 to 6.4% glucono-delta-lactone with from 2.0 to 2.44% sodium bicarbonate; and from about 1.75 to about 1.95% quick-leavening active dry yeast; all percentages based on the weight of the mix.

22. A bread mix according to claim 14 for preparing rye bread wherein the flour comprises a blend of high gluten wheat flour and rye flour; the dough conditioner comprises sodium stearoyl-2-lactylate in an amount of from about 0.4 to about 0.6% based on the weight of the mix; and the mix further comprises rye bread flavorant.

23. A bread mix according to claim 22 which consists essentially of: a blend of high gluten wheat flour and rye flour; flavorants; from about 0.2 to about 0.3% inactive dry yeast; from about 1.5 to about 2.5% non-fat dry milk; from about 1.0 to about 2.5% sodium chloride; from about 1.0 to about 2.5% sugar; from about 1.0 to about 2.0% granular shortening; from about 0.4 to about 0.6% sodium stearoyl-2-lactylate; from 4.24 to 6.4% glucono-delta-lactone with from 2.0 to 2.44% sodium bicarbonate; and from about 1.75 to about 1.95% quick-leavening active dry yeast; all percentages based on the weight of the mix.

24. A bread mix according to claim 22 wherein the rye bread flavorant comprises, based on the weight of the flavorant: rye flour, about 3 to about 9% dill seed, about 4 to about 10% caraway, about 15 to about 40% salt, about 0.25 to about 2% fennel; about 0.05 to about 2.5% onion powder; about 0.1 to about 1% acetic acid; about 2.5 to about 10% lactic acid; about 2.5 to about 8% phosphoric acid; about 0.1 to about 0.4% propionic acid; and spices.

25. A bread mix according to claim 14 for preparing pumpernickel bread wherein the flour comprises a blend of high gluten wheat flour, rye flour and pumpernickel meal; the dough conditioner comprises sodium stearoyl-2-lactylate in an amount of from about 0.4 to about 0.6% based on the weight of the mix; and the mix further includes brown colorant and pumpernickel flavorant.

26. A bread mix according to claim 25 which consists essentially of: a blend of high gluten wheat flour, rye flour and pumpernickel meal; flavorants; brown colorant; from about 0.2 to about 0.3% inactive dry yeast; from 4.24 to 6.4% glucono-delta-lactone with from 2.0 to 2.44% sodium bicarbonate; from about 1.0 to about 2.5% sodium chloride; from about 1.0 to 2.5% sugar; from about 1.0 to about 2.0% granular shortening; from about 0.4 to about 0.6% sodium stearoyl-2-lactylate; and from about 1.75 to about 1.95% quick-leavening active dry yeast; all percentages based on the weight of the mix.

27. A bread mix according to claim 14 wherein the balanced chemical leavening system comprises a couple selected from the group consisting of: from 4.24 to 6.4% glucono-delta-lactone and from 2.0 to 2.44% sodium bicarbonate; from 1.5 to 3.4% sodium aluminum phosphate and from 1.24 to 2.5% sodium bicarbonate; from 1.7 to 2.0% sodium acid pyrophosphate and from 1.25 to 1.5% sodium bicarbonate; and from 1.25 to 2.5% sodium aluminum phosphate and an equal weight of sodium bicarbonate.

28. A product prepared according to the process of either of claims 1 or 12.

* * * * *